F. V. WRIGHT.
METHOD OF CONCURRENTLY MAINTAINING AND CULTIVATING LEVEES.
APPLICATION FILED DEC. 9, 1916.
1,262,898.
Patented Apr. 16, 1918.
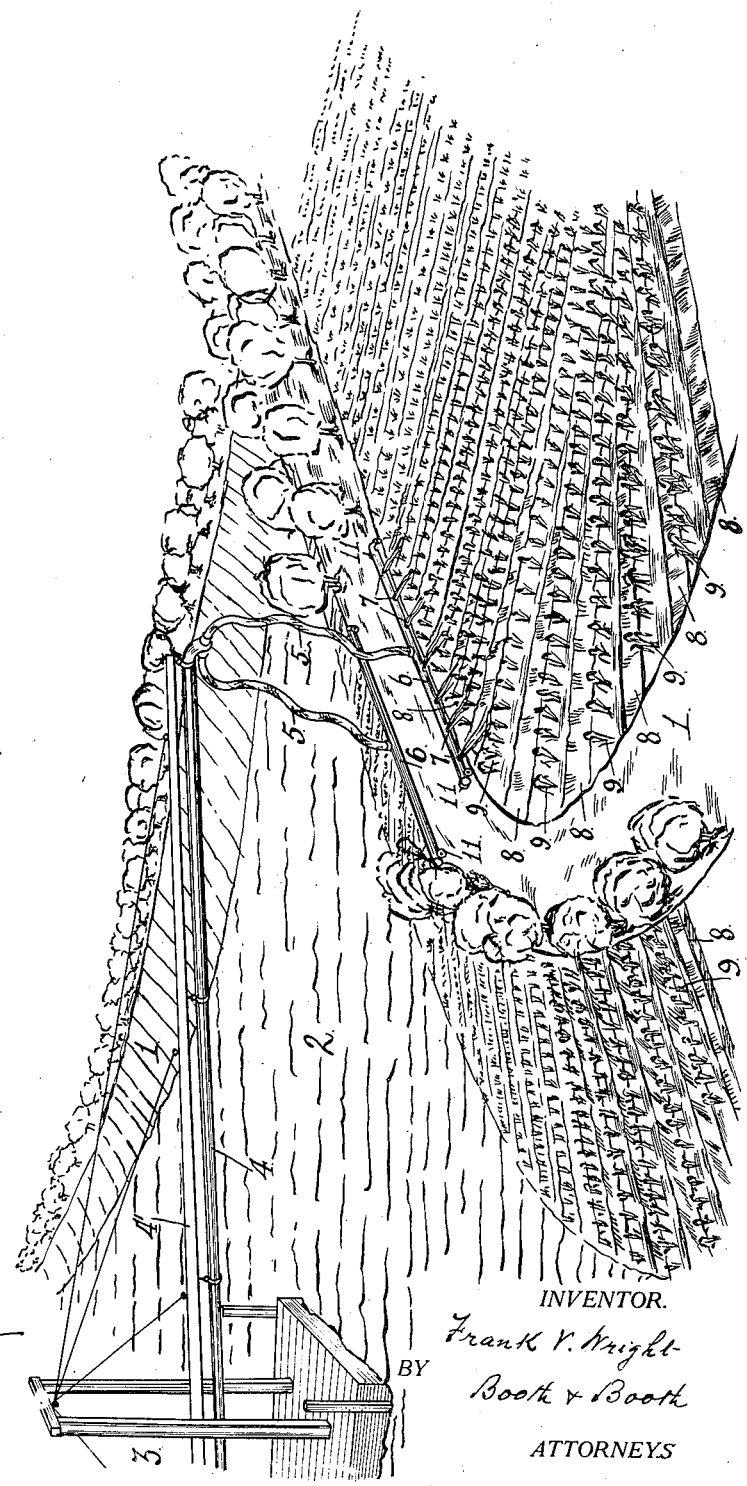
WITNESS
INVENTOR.
Frank V. Wright
BY Booth & Booth
ATTORNEYS

UNITED STATES PATENT OFFICE.

FRANK V. WRIGHT, OF ALAMEDA, CALIFORNIA.

METHOD OF CONCURRENTLY MAINTAINING AND CULTIVATING LEVEES.

1,262,898.     Specification of Letters Patent.     Patented Apr. 16, 1918.

Application filed December 9, 1916. Serial No. 136,070.

*To all whom it may concern:*

Be it known that I, FRANK V. WRIGHT, a citizen of the United States, residing at Alameda, in the county of Alameda and State of California, have invented certain new and useful Improvements in Methods of Concurrently Maintaining and Cultivating Levees, of which the following is a specification.

My invention relates to the art of maintaining levees, combined with their practical utilization as farming areas.

My invention consists in a novel method by which the maintenance and cultivation of levees may be concurrently interdependent and highly economical. Before stating my method, it will be well to set forth present practice and its disadvantages, in order to show by comparison the objects I seek and the results of my method.

Though I shall describe both the present practice and my novel method as applicable to the reclaimed lands of California, it is to be understood that substantially the same practices can be applied elsewhere.

Throughout the reclaimed lands of California, the levees which protect these lands from high water and tidal overflow, are usually constructed and maintained by a machine, known as the clam-shell dredger.

Levee maintenance by this machine does not permit of growing crops of any kind upon the surface of the levee, because the necessity for redredging the levee is liable to occur at any time, and growing crops would become lost and smothered by the sudden addition of solid mud of the depth of two feet or more.

For this reason it is customary to plow and harrow the levees in order to close up the cracks caused by the shrinkage of the wet mud material dredged, for the purpose of holding the structure up to grade; but not to plant anything of commercial importance thereon.

The cost of this annual repairing of the levee systems throughout the delta region and reclaimed land districts is very great.

The dredging of the levees, and afterward the plowing, and their subsequent harrowing or "working down", become a very burdensome annual tax; while a further loss exists in the fact that the land upon which the levee stands is thus rendered waste and idle as far as profit is concerned, by this system of levee maintenance.

The levees, if they are built from a point of safety, should cover ground amounting to an acre wide in the delta region, while in other localities, where greater height is required, the acre space should be increased in proportion.

As a matter of fact, the land composing the levee surfaces is the richest and most valuable portion, acre for acre of any given tract of reclaimed land.

The levee surfaces border on the rivers and sloughs, and are, therefore, nearer to transportation and closer to the water for irrigation. The alluvial solid deposit from the river bottoms, for refertilizing the land, is close at hand; also the sloping surfaces of the levee give rapid and absolute drainage; and altogether the levees form an ideal space of ground for intensive farming.

The vast amount of land which constitutes the levee system throughout the reclaimed lands and the delta region in California runs into thousands of acres.

It is with the object of concurrently maintaining and utilizing the vast spaces of the now idle land, which constitute the levees, that my method has been evolved.

My method consists essentially as follows:—I first plant a crop on the levee surfaces in rows, and make trenches between the rows. Then I raise mud-carrying water from the bottom of the stream. This mud-carrying water I distribute in the trenches in a quantity sufficient for irrigation and for the deposit of a relatively thin layer of mud in said trenches. This distribution of the mud-carrying water I repeat at intervals until the crop is harvested and the trenches are filled with mud. Then I plant a new crop in the mud-filled trenches and I make new trenches in the ground from which the first crop was harvested. I then begin the distribution of the mud-carrying water to the new trenches and repeat it at intervals until the second crop is harvested and the new trenches filled with mud. Then I plant a third crop in the mud filled second trenches, and make a third set of trenches in the ground from which the second crop was harvested; and thereafter I repeat the cycle of operations indefinitely.

In carrying out this method any suitable apparatus may be employed. In the accompanying drawings, I show such portions of an apparatus as will convey an understanding of the practice of my method.

In these drawings the figure is a general view of a levee prepared for the practice of my method and an apparatus by which it may be carried out.

1 is the levee. 2 is the water course. 3 is a dredger of the suction type. 4 is the discharge pipe line carried by the boom 4' and extending to and held high enough above the levee to clear obstructions thereon. From the suction pipe line is suspended by flexible, slack connections 5, the distributers 6. There may be one or more of these. I have here shown two—one for the outer slope of the levee and one for the inner slope.

The distributer is a pipe having a plurality or multiplicity of outlets 7, spaced apart by the distance between centers of the trenches 8 formed in the levee. 9 are the rows of growing plants between which the trenches are formed. The dredger sucks up the mud-carrying water from the stream bottom and delivers it to the trenches through the distributers 6. When a sufficient quantity of said mud-carrying water is delivered, the distributers are moved on their own length; and that their travel may be easy and accurate, they may be provided with rollers 11.

In order to more fully understand the necessities and use of the apparatus, thus outlined, in carrying out my method, I may give a more detailed description as follows:—The method is one of combined levee maintenance and what may be termed intensive farming. In this method suction dredging is a sine qua non, for only mud in liquid for u, or as it may also be expressed, water carrying mud in suspension can be used. Let us take four miles of levee 208 feet, or one acre wide. This is 100 acres of land surface. A dredge capable of taking care of this amount of ground would be a small unit equipped with a six inch sand pump, and machinery especially adapted for the work.

The digging ladder should be supplied with a water jet agitator, in place of the ordinary steel cutter, for the reason that the water jets will stir up the silt, sand and clay, and will more thoroughly mix up these different earthy ingredients, comprising the river bottoms, than would a cutter, which frequently delivers the mud in chunks; the object being to obtain a mixture of mud and water of about 20% solid material, well screened of chunks, so that it will run without clogging through the pipes into the numerous channels or trenches throughout the levee, where it will be readily assimilated by the growing crops on the embankment.

Instead of the usual set pipe line to run the material ashore, the dredger will be supplied with a swinging derrick boom 4' which carries the discharge pipe line over to the center of the levee, and is held up high enough to clear all growth on the levee. At the end of the boom the discharge pipe is branched into two flexible hose-pipes 5, for the purpose of spreading the discharging material on both sides of the levee from the top, each way, over the levee surfaces. These hose-pipes each connect with a distributer pipe 6 provided with multiplied outlets 7. These two discharge pipes rest on either side of the levee, and act as ground distributers of the discharging material.

By means of the multiplied outlets 7 in these two pipes 6, the discharging material is placed under perfect control; the velocity is overcome; and the muddy water flows gently in the direction desired, without any erosion to the land whatever.

The multiplied outlets 7 may be opened or shut off, and are so spaced apart, that a small stream of muddy water may be caused to flow down into trenches 8 through the centers, between each row 9 of growing crops, on one or both sides of the levee at the same time, from the top of the levee, down the sides to the bottom.

After enough muddy material, say a relatively thin layer, has been delivered into the trenches, down through the rows of growing crops, and the ground has become sufficiently saturated with the liquid material for irrigation, the two long distributer pipes 6 are moved ahead to trenches beyond, and in like manner further spaces of the levee are dredged and the land irrigated.

The dredger may be equipped with suitable machinery for chopping or grinding up peat, bundles of tule, straw or any other cheaply gathered vegetable material and passing the same into the discharge pipe to be distributed with the discharging material. This may be used whenever a larger proportion of humus substance is required to prevent the dredged material from becoming too hard, or "baking." It will also be well, whenever necessary, to raise the temperature of the dredged material, during times of frost and cold weather.

By being able to irrigate with water only slightly warmed, crops can be saved from frost. To do this there may be a steam or electric heating coil in the discharge pipe leading to the boom on the dredger, which will warm the discharging material as much as desired; also on a dredger where gasolene power is used, the warm water from the cooling jacket of the engine may be passed into the discharge pipe.

Under my method the levee becomes more permanent, each year that it is maintained; with an increasing factor of safety, with the addition of time.

Instead of crystallizing or "honey-combing," the embankment, automatically, becomes higher, broader, and more solid, as time passes on.

By this method the levee will pay for its maintenance, and show a large profit besides. The levees cease to be a tax—a continued financial burden for maintenance, but will yield a greater income,—acre for acre, than the interior lands, which are protected by the same levees.

These results, it will be seen, are obtained by suction dredging, especially adapted for the purpose, in combination with intensive farming.

In practice, the suction dredger will work continuously night and day, for six months out of the year, or a sufficient time to spread gradually over the levee surfaces an amount of solid material two feet deep. This is the levee maintenance. The surfaces of the levee, above the high water line, which should average 200 to 500 feet in width—according to the height of the embankment, are intensively farmed.

This is the cultivation and brings in the income.

The farming operations being carried on in conjunction with the suction dredging, the two are interdependent. The entire output of the suction dredger is absorbed in the two-fold proposition of irrigation and enrichment of the soil, accomplished by spreading or running the liquid muddy water down through the center of the rows of growing crops on the levee surface.

The cultivation necessary to plant and harvest a continuous line of crops, on the levee surfaces, is what is required to keep the levee from cracking on the outside, and crystallizing on the interior.

The liquid mud thus gradually spread upon the surfaces of the levee amounting annually to 2 feet deep, together with the water necessary to carry the mud in solution, is what is required to enrich and irrigate the soil in carrying on intensive farming.

Very frequent enrichment of the soil, and constant irrigation, are required for intensive farming, and this also keeps the levee solid and free from cracks.

The usual method of spreading practically at once about two feet of solid material, renders the levee sterile for several months after such dredging. By my method the same amount of levee material, totaling 2 feet in depth, is spread over the levee surfaces gradually, together with the water;—enough each week to irrigate the growing crops on the levee surfaces, and at the same time to enrich the soil for subsequent crops.

By the planting of subsequent crops, in the filled channels or trenches where the muddy water was conducted over the levee, for the purpose of irrigating the previous crops, it will be seen that these filled channels are thoroughly saturated with the deposits of earthy material, from the suction dredging and are sufficiently enriched to grow crops of the same kind, or variety, again if desired, there being no necessity, under this method, to rotate the crops, or rest the land in any manner whatsoever. The object is to continuously plant, crop after crop, as many as can be harvested, during the entire year, and of the sort, or kind which will bring in the most money.

It will be seen from the foregoing, that the suction dredging necessary for this kind of levee maintenance, and done in the manner heretofore described, is what constitutes the chief element in my intensive farming, by making it possible to continuously plant on the same levee surfaces, crop after crop, without rotation of crops or rest to the land. It will be also seen that were it not for the income derived from the sales of the products of the intensive farming, it would not be practicable nor possible to give the levee the same attention, and to expend upon it the same labor as is required to produce these crops by intensively farming the levee surface.

The numerous channels or trenches which take up and distribute the entire output of the suction dredger, are an important feature of this method. These trenches should be sufficiently numerous to conduct the muddy water away from the discharge pipes upon the levee down through the rows of growing crops without any erosion, and at the same time to be accurately spaced, so as to give ample room for the growing and maturity of said growing crops. After one area of space is sufficiently irrigated the distributing pipes are moved ahead, and the suction dredger, in like manner, moves up or down the river, or around the tract, in each case following up the levees with the work of maintenance.

It will be seen that the trenches through the centers of rows of growing crops, by means of which the discharging material from the suction dredger has been distributed over the levee surfaces, have become heavily impregnated with the alluvial soil of the river bottoms; and these channel spaces are the ground where the next crop will be planted, and the new channel is now dug where the previous crop was harvested. In this process, instead of rotating the crops, I change, or, rotate the places where the crops are planted, with the places where the channels are dug.

It is necessary to evenly distribute the material for levee maintenance, in order to hold the structure "up to grade" and this result is obtained by systematically planting the new crop, in the channel, or trench which irrigated the previous crop, and by digging the new trench for the purpose of irrigating the new crop in the place where the previous crop was planted, as heretofore outlined.

By this method I have a system, which provides continuously new enriched ground for planting the new crop, by utilizing the enriched space of ground which was heretofore used for the irrigating channel for the previous crop.

The complete method forms an accurate, uniform and reliable system of levee maintenance.

I claim:

The method of concurrently maintaining and cultivating levees which consists in planting a crop in rows upon the levee, and making trenches between said rows; raising from the bottom of the water course which the levee borders, water which carries mud in suspension; distributing said mud-carrying water in the trenches between the crop rows in quantity sufficient for irrigation of the crop and for the deposit of a layer of mud in said trenches; repeating said distribution of the mud-carrying water in the trenches at intervals until the crop is harvested and the trenches are filled with mud; planting a second crop in the mud-filled trenches, and making new trenches in the ground from which the first crop was harvested; distributing said mud-carrying water in the new trenches in quantity sufficient for irrigation of the new crop and for the deposit of a layer of mud in said new trenches; repeating said distribution of the mud-carrying water in the new trenches at intervals until the new crop is harvested and the new trenches are filled with mud; planting a third crop in the mud filled second trenches and making third trenches in the ground from which the second crop was harvested; and repeating the cycle indefinitely.

In testimony whereof I have signed my name to this specification in the presence of two subscribing witnesses.

FRANK V. WRIGHT.

Witnesses:
WM. F. BOOTH,
D. B. RICHARDS.